United States Patent [19]

Semaan

[11] Patent Number: 4,823,769
[45] Date of Patent: Apr. 25, 1989

[54] SELF HEATING FOOD RECEPTACLE

[76] Inventor: Naji Semaan, 1929 N. Pine Island Rd., Plantation, Fla. 33322

[21] Appl. No.: 105,085

[22] Filed: Oct. 5, 1987

[51] Int. Cl.$^4$ .............................................. F24J 1/00
[52] U.S. Cl. ................................... 126/263; 126/262
[58] Field of Search ............... 126/263, 262; 206/219, 206/222; 426/109; 62/4, 294; 220/3.1, 412, 902, 903

[56] References Cited

U.S. PATENT DOCUMENTS

| | | | |
|---|---|---|---|
| 2,623,515 | 12/1952 | Sukacej | 126/263 |
| 3,561,424 | 2/1971 | Failla | 126/263 |
| 3,653,372 | 4/1972 | Douglas | 126/263 |
| 3,675,637 | 7/1972 | Trimble | 126/263 |

FOREIGN PATENT DOCUMENTS 12585 of 1894 United Kingdom ................ 126/263

Primary Examiner—Randall L. Green
Attorney, Agent, or Firm—Kevin P. Crosby

[57] ABSTRACT

A self-heating food system comprised of a retort packaged food container disposed above an hermetically sealed reaction chamber and a relatively small rigid rod placed therebetween. Said reaction chamber has therein a water containing ampule and quantity of calcium oxide, both reagents in an exothermic reaction, said food container, rod and reaction chamber being situated within a resilient housing, said housing being disposed within an insulating envelope having a cover. Means are provided for causing said rod to come into crushing contact with said water ampule so that the water within said ampule will be distributed in vigorously reactive contact among said calcium oxide for heating the food in said food container.

6 Claims, 2 Drawing Sheets

SELF HEATING FOOD RECEPTACLE

FIELD OF THE INVENTION

This invention relates to the field of portable self-heating food receptacles and more particularly relates to a novel combination of a food containing retort-packaged receptacle with a separate hermetically sealed calcium oxide and water reaction chamber wherein a thin glass ampule containing said water is rupturable from the exterior of said reaction chamber by movement of a relatively small rigid rod.

PRIOR ART

Attempts have been made in the past to provide a combination food receptacle disposed above, or in close association with, a reaction chamber containing calcium oxide or quicklime with water. Means are provided therein for rupturing a vessel containing the water. The means for rupturing therein, however, necessitate communication between the interior of reaction chamber and the external environment. The opening created by said communication allows leakage of humidity into the reaction chamber which inevitably leads to a slow, unnoticeable reaction of the quicklime with said humidity, thereby reducing or eliminating the reaction energy remaining within the quicklime at the time actual use is desired.

Representative examples of the foregoing are shown in the following Patents: U.S. Pat. Nos. 4,559,921, 4,640,264, 4,501,259; German No. 1,214,600.

It has also been proposed to utilize a plastic or other flexible vessel to house the reaction water. Said vessels are prone to "perspiration" which would cause an untimely reaction with the quicklime. Flexible vessels may also shift about within the reaction chamber and when ruptured distribute water unevenly, leading to an uneven reaction.

A further example of devices of this sort is embodied in U.S. Pat. No. 2,615,443 to Sukacev showing a food container slidable in a housing, said housing containing at its bottom a water containing vessel and a supply of quicklime. However, Sukacev at 6 shows a seal between the external atmosphere and the reaction chamber consisting of removable tape. Should said tape be accidentally removed or become loosened, humidity may leak in. Further, the ampule is designed to be ruptured by a blow from the outside of the container, which blow may, if administered too hard, lead to a crushed can. Further, if the glass ampule is harder than the quicklime inside, there will not be enough resisting force against the ampule to allow a blow against the container to break the glass. U.S. Pat. No. 820,638 to Gabriel represents a further drawback.

A still further attempt at providing a device for heating food contained in a sealed container is disclosed in U.S. Pat. No. 4,501,259 to Apellaniz. Apellaniz, however, requires a piercing tool to be inserted at 20 thereof to communicate the water containing vessel with the quicklime containing vessel. Such a configuration can be cumbersome, especially when a piercing element small enough to fit through area 20 is unavailable.

A still further effort at providing a food self-heating receptacle is disclosed in U.S. Pat. No. 3,903,011 to Donnelly, along with companion U.S. Pat. No. 4,002,235 to Donnelly. An inherent disadvantage results from the food receptacle thereof 25 making direct crushing contact with container 20 thereof. Should a sharp fragment of container 20, which is disclosed as an easily rupturable or broken container, pierce food vessel 25, contamination of the food by the vigorously reacting quicklime would result.

SUMMARY OF THE INVENTION

The instant invention overcomes these and other disadvantages of providing a novel combination of a retort packaged food containing vessel disposed in heat transfer relationship with a hermetically sealed chamber containing a water, glass or other easily rupturable vessel lodged against movement amongst a supply of calcium oxide, or quicklime. Means are provided for rupturing said water bearing ampule without piercing the hermetic seal of the reaction chamber.

To this end, a rigid, relatively small rod is provided in juxtaposition between the food and reaction vessels, respectively, wherein downward movement of said rod causes said rod to rupture or break said thin glass ampule, thereby causing dispersion of water throughout the quicklime and a vigorous, exothermic reaction. The reaction continues for a number of minutes until exhaustion, during which time the food in the food containing vessel above the reaction chamber is heated. The amount of quicklime and water provided can be varied depending upon the degree of heating desired and the amount of food to be heated. The system may be made available in a commercially saleable package including a styrofoam housing for insulating the user from the heat produced by the reaction. Further accouterments may be provided, for example a net or other bag housing the invention with a knife and fork, seasonings, etc.

In order that the water ampule may be ruptured by said rod, the rod must be moved in relation thereto. To this end, two methods of manipulating said rod may be employed. The first contemplated is to place the rod in generally horizontal relation askew of the elongate centerline of the water ampule directly above said ampule so that downward movement of the food containing vessel on top of said rod will cause the rod to bear down upon the water ampule and rupture it. As a resisting force is necessary to allow the rod to break the ampule, the system may be employed with a housing which is flexible so that when the food container is pressed generally vertically downward onto said rod and a shoulder portion of said housing, the bottom peripheral edge of said housing may be made to yield downwardly and thereby flex the lower surface of said lower housing upwardly against the underside of the ampule, forcing said ampule further upward against the glass rod.

In a second embodiment, the rod may be positioned askew of said elongate centerline of said ampule, hinged at one end to the housing, the other end passing through said housing and connected to a depressable tab. Depressing said tab causes the rod to swing downwardly into rupturing contact with said ampule, resulting in the distribution of water therein throughout the quicklime.

It is accordingly a primary object of the present invention to provide a food heating system that is portable, disposable, has an indefinite shelf life, the heating process of which is activated easily and safely against contamination of the food.

It is another object of the present invention to provide a novel food heating system comprised of a retort packaged food container, a reaction chamber containing an easily rupturable water vessel in generally fixed association with a quantity of quicklime, and a surrounding envelope structure comprised of a relatively flexible polypropylene housing within an insulating container. A rigid relatively small rod is placed transversely to and askew of the elongate centerline of said water ampule which is made to be brought into rupturing contact therewith so as to cause the distribution of water throughout the quicklime for heating of the food. The reaction vessel is preferably hermetically sealed so as to prevent the contamination of the interior with moisture from the atmosphere. Means are provided for allowing the escape of steam byproduct from the quicklime and water exothermic reaction. Said steam byproduct is directed along the sides of and over the top edge of said food container for uniform heating. Upon rupturing of said ampule, the exothermic reaction begins, same causing the hermetic seal to be broken.

DETAILED DESCRIPTION OF THE PREFERRED EMBODIMENT

Figure 1:
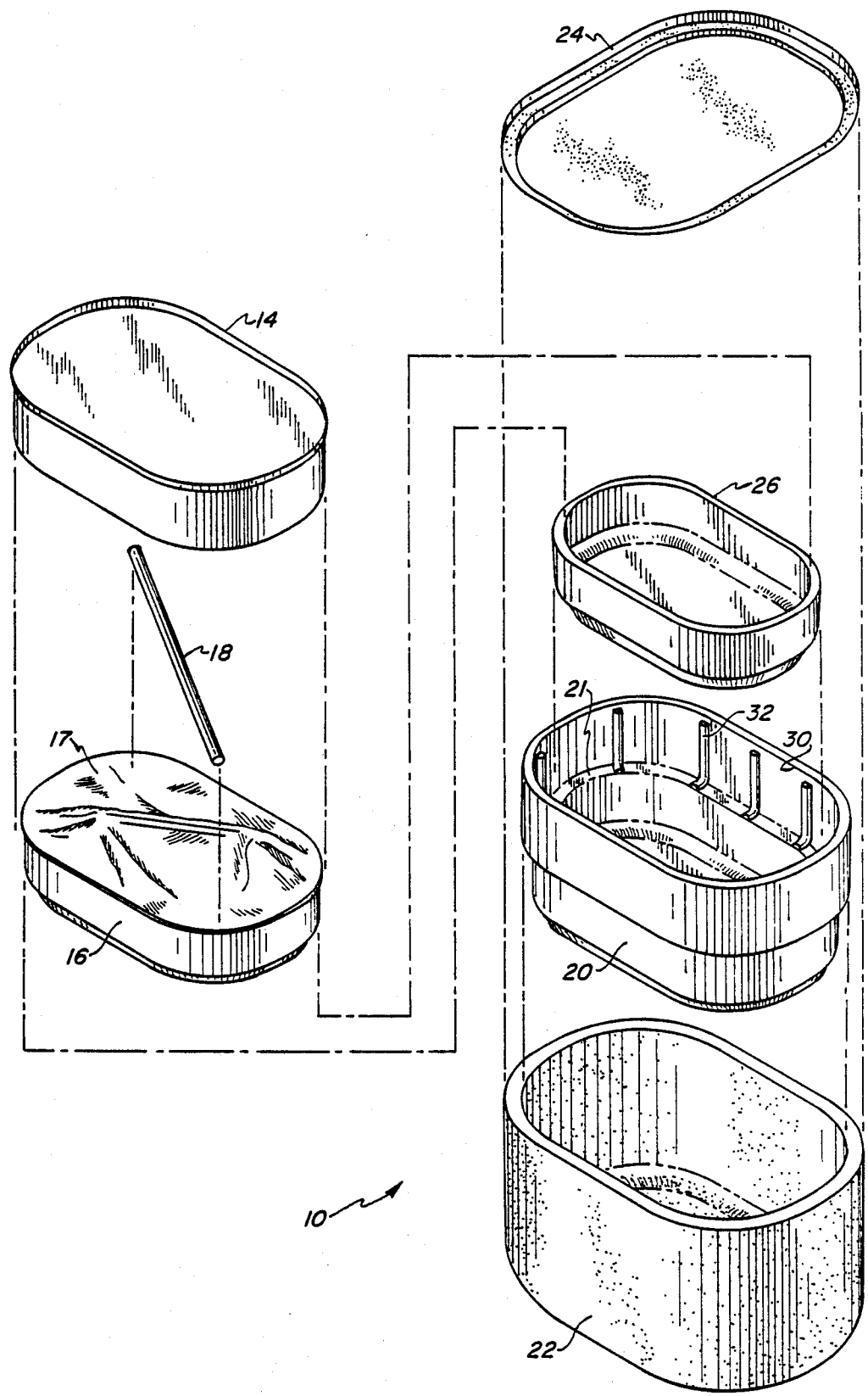
FIG. 1 is an exploded view of a first embodiment of the invention.

Referring now to the drawings, FIGS. 1 through 4 show a first embodiment 10 of the instant food heating system comprised of a retort packaged food heating receptacle 14 disposed above a reaction chamber 16 containing a supply of quicklime and a rupturable water vessel. A rigid rod 18 is disposed therebetween which is designed to be brought into contact with the exterior of said reaction chamber 16 so as to become distributed throughout the quicklime. The water and quicklime react in a vigorous exothermic manner, giving off heat and steam to heat the food in receptacle 14.

Preferably, elements 14, 16 and 18 are placed within a commercially attractive, safe and saleable assembly comprised of a relatively flexible housing 20 having an internal peripheral ledge or shoulder 21 therein for supporting the lower peripheral edge of food vessel 14, reaction vessel 16 sized and shaped to fit down into the lower portion of housing 20, below shoulder 21. An insulating jacket 26 may be employed to surround reaction chamber 16 when placed in housing 20. Said package structure is further comprised of an insulating outer jacket 22 with conforming cover 24. Jacket 22 with cover 24 should be made of a material having a low coefficient of thermalconductivity so as to allow a user of the invention to hold same in their hands without feeling excessive heat from the reaction within.

Figure 2:
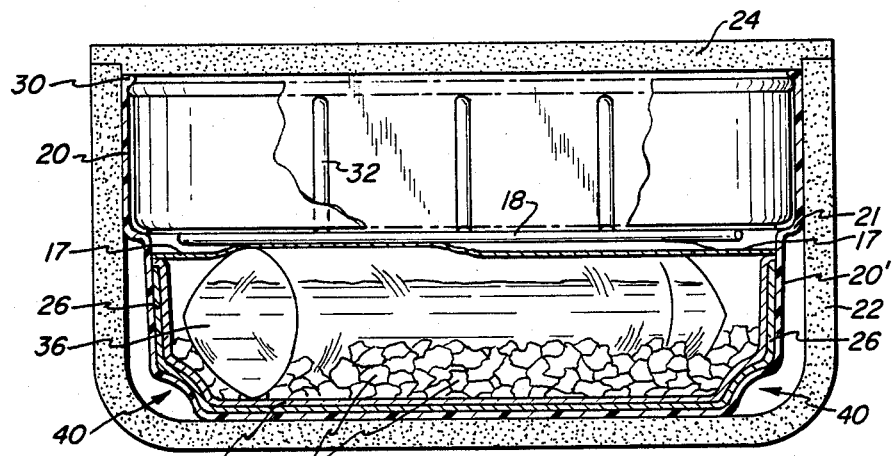
FIG. 2 is a cross sectional side view of the invention of FIG. 1 in assembled form.
Figure 3:
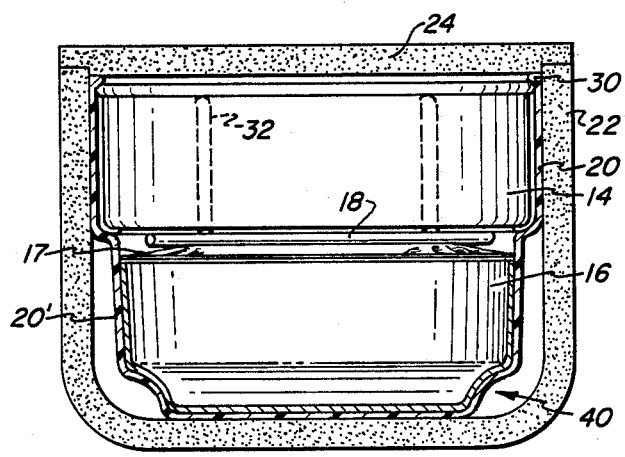
FIG. 3 is a cross sectional end view of the invention of FIG. 1.
Figure 4:
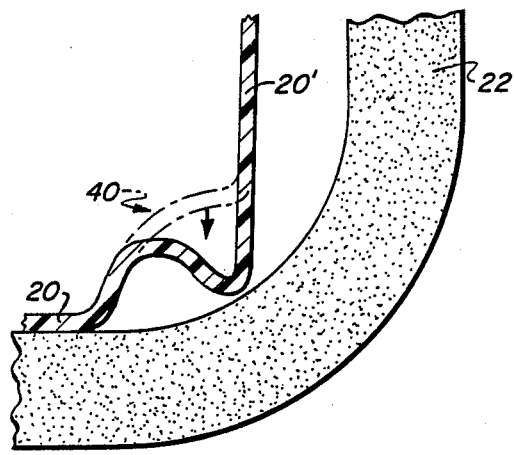
FIG. 4 is a detail showing the resilient corner structure of the polypropylene housing.

As best seen in FIGS. 1 and 2, reaction chamber 16 is hermetically sealed, preferrably vacated of atmosphere inside, using a top sheet sealed by any known polypropylene lamination method. In the alternative, said top sheet 17 can be sealed by way of adhesives or other appropriate sealing means. It is to be understood however that the seal created must be effective to preclude penetration thereinto by moisture from the atmosphere.

In the preferred embodiment, water ampule 36 is disposed transversely (i.e.: from corner to corner) in reaction chamber 16 so as to be held firmly in place against shifting. Shifting of the ampule 36 could result in premature breakage or positioning thereof so that when broken the water contained therein would not distribute evenly through the quicklime.

As best seen in FIGS. 1 through 4, rigid rod 18 is disposed transversely opposite to water ampule 36 between reaction chamber 16 and food container 14. Reaction chamber 16 is nested within insulating collar 26 which in turn is nested within the bottom recess of housing 20. Food container 14 sits atop shoulder 21 of housing 20 and is held against shifting movement by spacing ribs 32. Spacing ribs 32 also provide a space between housing 20 and food containr 14 for heated air and steam to pass during the reaction and heating process. Housing 20 is preferably provided with peripheral annular lip 30 around the upper perimeter thereof to effectuate direction of heated air and steam around the top edge of food container 14 and over a portion of the upper surface thereof, as well as to hold food container 14 in place against any tendency of said food container to lift out of housing 20 prematurely. It should be noted that insulating jacket or envelope 22 has sidewalls which extend above the height of housing 20 at lip 30 so that when cover 24 is in place, downward pressure upon said cover 24 will not result in movement downward of food container and housing 20, but rather will be absorbed by the sidewalls of said envelope 22. To provide otherwise could allow the potential premature crushing of the water ampule and resultant exothermic reaction.

A novel feature of this first embodiment resides in the scalloped lower peripheral corner 40 of housing 20. Preferably sleeve 26 and reaction chamber 16 are sized and shape to conform generally to scalloped corner 40. In use, after cover 24 is removed, downward pressure upon the top of food receptacle 14 is transferred to shoulder 21 which in turn causes a downward pressure on housing lower side wall 20' which in turn causes said corner portion 40 to yield in a downward direction. The inherent resiliency of the material of housing 20 causes corner portion 40 to exert a twisting moment in the vicinity of the juncture of lower surface of housing 20 with corner 40 and thereby causes the lower surface of housing 20 to bow upwardly, forcing water ampule 36 into contact with rod 18. At the same time, downward movement of food vessel 14 exerts a downward force between rod 18 and water vessel 36, leading to the rupture thereof. It can be seen, therefore, that the use of rod 18 to rupture water ampule 36 eliminates the danger of glass piercing food vessel 14.

Figure 5:
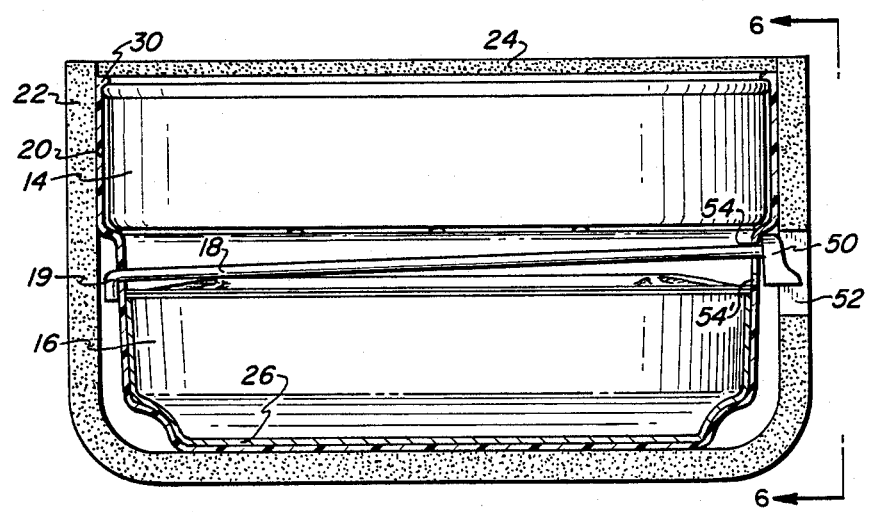
FIG. 5 is a cross sectional side view of a second embodiment of the invention.
Figure 6:
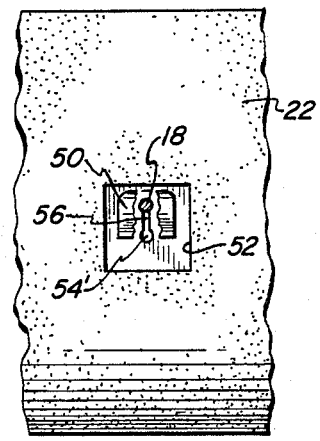
FIG. 6 is a partial end view taken along lines 6—6 of FIG. 5.

In a second embodiment of the instant invention, shown in FIGS. 5 and 6, rod 18 is disposed perpendicularly to the elongate centerline of housing 20 and is hinged at bent end 19 which passes through a conforming opening in housing 20 at one end of rod 18. The other end of rod 18 passes through a second opening in the opposite side of housing 20 and has connected thereto a finger-push tab 50. Said second opening in housing 20 is an elongated slot having a narrowed intermediate portion 56 and an enlarged upper circular portion 54 and a lower circular portion 54'. Circular portions 54 and 54' are preferably sized to conform generally to the cross sectional diameter of rod 18 so that heat escape therethrough during reaction will be minimized. Narrowed portion 56 is preferably slightly smaller than said cross sectional diameter so that rod 18 can only be moved from opening 54 to opening 54' by considerable finger force exerted on tab 50. To this end, a conforming cut-out 52 is provided in the side wall of insulating envelope 22 to allow access to said tab 50.

In use of this second embodiment, water ampule 36 is ruptured simply by pushing downward on tab 50, which causes rod 18 to move from opening 54 down through intermediate portion 56 and into opening 54', thereby bringing rod 18 into rupturing engagement with said ampule.

It should be noted that rod 18 may be provided with cutting serrations 18' or a cutting blade-edge with ampule 36 being an aluminum or other semi-flexible vessel pierceable or rupturable upon contact thereof by said rod 18 through cover sheet 17.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A self-contained food heating system, comprised of:
   a vessel containing food to be heated;
   a hermetically sealed reaction chamber disposed below said food vessel, said reaction chamber containing a rupturable water-containing vessel and a quantity of calcium oxide;
   a relatively rigid rod disposed between said food vessel and said reaction chamber in juxtaposition with said water containing vessel wherein downward movement of said rod causes said water containing vessel to rupture, releasing a supply of water therein into reactive contact with said calcium oxide, permitting said water to take part in a exothermic reaction with said calcium oxide;
   said reaction chamber is generally rectangular, said water containing vessel being transversely disposed therein and conforming to the diagonal length of said rectangular chamber, said water containing vessel thereby held fast against shifting movement;
   a generally resilient housing for receiving said reaction chamber and said food containing vessel in spaced, stacked relation; and
   a raised peripheral shoulder portion integrally connected to said housing for supporting said food containing vessel in spaced relation above said reaction chamber;
   said food containing vessel being movable relative to said water containing vessel to thereby urge said water containing vessel into rupturing contact with said rigid rod;
   said housing having a bottom surface means for supporting said reaction chamber, said housing having a yieldable lower peripheral corner section means for causing said bottom surface means to bow upwardly thereby causing said reaction chamber to move upwardly which in turn moves said water containing vessel into rupturing engagement with said rigid rod.

2. A self-contained food heating system, comprised of:
   a vessel containing food to be heated;
   a reaction chamber disposed below said food vessel, said reaction chamber containing a rupturable water-containing vessel and a quantity of calcium oxide;
   a relatively rigid rod disposed between said food vessel and said reaction chamber in juxtaposition with said water containing vessel wherein downward movement of said rod causes said vessel to rupture, releasing a supply of water therein into reactive contact with said calcium oxide, permitting said water to take part in an exothermic reaction with said calcium oxide;
   said reaction chamber is hermetically sealed;
   said reaction chamber is rectangular, said water containing vessel being transversely disposed therein and conforming to the diagonal length of said rectangular chamber, said water containing vessel thereby held fast against shifting movement;
   a generally resilient housing for receiving said reaction chamber and said food containing vessel in spaced, stacked relation; and
   a raised peripheral shoulder portion integrally connected to said housing for supporting said food containing vessel above said reaction chamber;
   said rigid rod is hingedly mounted to said housing, said rigid rod having associated therewith means for moving said rod between a first, normal, position, and a second, crushing, position wherein said rod ruptures said water containing vessel.

3. The self-contained food heating system of claim 2, wherein:
   said rigid rod is comprised of a first end and a second end, said first end being hingedly connected to one sidewall of said housing, said second end being disposed through an elongated slot in a sidewall of said housing opposite said one sidewall, said slot having a first rod receiving aperture through which is disposed said rod when said rod is in the first, normal, position, said slot having a second rod receiving aperture through which is disposed said rod when said rod is in the second, crushing, position, said slot further having an intermediate portion communicating said first and second rod receiving recesses, said intermediate portion being of a slightly smaller cross-sectional dimensison than the diameter of said first and second rod receiving recesses.

4. The self-contained food heating system of claim 3, comprised of:
   said rod includes means for piercing said water containing vessel, said vessel being a generally flexible metallized pouch.

5. The self-contained food heating system of claim 4, comprised of:
   said means for piercing includes sharp serrations.

6. A self-contained food heating system, comprised of:
   a vessel containing food to be heated;
   a reaction chamber disposed below said food vessel, said reaction chamber containing a rupturable water-containing vessel and a quantity of calcium oxide;
   a relatively rigid rod disposed between said food vessel and said reaction chamber in juxtaposition with said water containing vessel wherein downward movement of said rod causes said vessel to rupture, releasing a supply of water therein into reactive contact with said calcium oxide, permitting said water to take part in an exothermic reaction with said calcium oxide;

a generally resilient housing for receiving said reaction chamber and said food containing vessel in spaced, stacked relation; and a raised peripheral shoulder portion integrally connected to said housing for supporting said food containing vessel above said reaction chamber;

said rigid rod is hingedly mounted to said housing, said rigid rod having associated therewith means for moving said rod between a first, normal, position, and a second, crushing, position wherein said rod ruptures said water containing vessel;

said rigid rod is comprised of a first end and a second end, said first end being hingedly connected to one sidewall of said housing, said second end being disposed through an elongated slot in a second sidewall of said housing opposite said one sidewall, said slot having a first rod receiving aperture through which is disposed said rod when said rod is in the first, normal, position, said slot having a second rod receiving aperture through which is disposed said rod when said rod is in the second, crushing, position, said slot further having an intermediate portion communicating said first and second rod receiving recesses, said intermediate portion being of a slightly smaller cross-sectional dimension than the diameter of said first and second rod receiving recesses.

* * * * *